US006380989B1

(12) United States Patent
Förster et al.

(10) Patent No.: US 6,380,989 B1
(45) Date of Patent: Apr. 30, 2002

(54) DISPLAY SYSTEM AND METHOD FOR SUPPLYING A DISPLAY SYSTEM WITH A PICTURE SIGNAL

(75) Inventors: Robert Förster, Wörth; Reiner Kirchner, Neutraubling; Martin Michel, Wenzenbach, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/221,788

(22) Filed: Dec. 28, 1998

Related U.S. Application Data

(63) Continuation of application No. PCT/DE97/01163, filed on Jun. 9, 1997.

(30) Foreign Application Priority Data

Jun. 27, 1996 (DE) ........................................ 196 25 898

(51) Int. Cl.[7] ........................... H04N 3/14; H04N 9/74; H04N 5/445

(52) U.S. Cl. ....................................... 348/790; 348/792

(58) Field of Search ................................ 348/563, 564, 348/569, 589, 600, 792, 793, 790; 345/212, 213; H04N 5/445, 9/74, 3/14

(56) References Cited

U.S. PATENT DOCUMENTS 5,227,882 A * 7/1993 Kato .......................... 358/160
5,432,905 A * 7/1995 Hsieh et al. ................ 395/162
5,473,382 A * 12/1995 Nohmi ....................... 348/448
5,576,738 A * 11/1996 Anwyl et al. ............... 348/212
5,610,621 A * 3/1997 Itoh et al. ...................... 345/3
5,635,984 A * 6/1997 Lee ........................... 348/333
5,680,177 A * 10/1997 Abe ........................... 348/564
5,726,702 A * 3/1998 Hamaguchi et al. .......... 348/13
5,812,209 A * 9/1998 Nishigaki ................... 348/553
5,969,767 A * 10/1999 Ishikawa et al. ............ 348/564
5,969,769 A * 10/1999 Hamadate ................... 348/568
5,978,041 A * 11/1999 Masuda et al. ............. 348/563
5,990,975 A * 11/1999 Nan et al. ................... 348/588
6,052,119 A * 4/2000 Chiang ....................... 345/212
6,057,813 A * 5/2000 Matsumoto .................. 345/26
6,057,888 A * 5/2000 Bril ........................... 348/553

OTHER PUBLICATIONS

"Video Pixel Multiplexer", IBM Technical Disclosure Bulletin, vol. 35, No. 1A, Jun. 1992.

* cited by examiner

*Primary Examiner*—Reinhard J. Eisenzopf
*Assistant Examiner*—Brian P. Yenke
(74) *Attorney, Agent, or Firm*—Herbert L. Lerner; Laurence A. Greenberg; Werner H. Stemer

(57) ABSTRACT

A display system and a method for supplying a display system with a picture signal are described, in which the picture signal is fed in dependence on a system clock pulse of the display system, whereby an improvement in the picture quality is achieved. A particularly good picture quality is achieved if a change of the picture signal for one picture pixel to the picture signal for the following picture pixel is chosen to be temporally shifted relative to the sampling instant at which the display system samples the picture signal.

10 Claims, 2 Drawing Sheets

DISPLAY SYSTEM AND METHOD FOR SUPPLYING A DISPLAY SYSTEM WITH A PICTURE SIGNAL

CROSS-REFERENCE TO RELATED APPLICATION

This application is a continuation of PCT/DE97/01163, filed on Jun. 9, 1997, which designated the United States.

BACKGROUND OF THE INVENTION

Field of the Invention

The invention relates to a display system having a display that is controlled by a display controller that in turn is driven by a picture controller. A system clock pulse is provided to a picture signal source that feeds a picture signal to the picture controller that gets displayed on the display in dependence on the system clock pulse.

Display systems are used to display pictures using a video signal or a television signal such as, NTSC or PAL standard, liquid crystal displays (LCD) being used, for example.

European Patent EP 0 489 757 B1 discloses a clock-controllable driving unit, constructed as an integrated circuit, of a display system in which a plurality of identically constructed integrated circuits are provided for art of the display in each case. A character generator is provided which, after the inputting of a code, reads output signals from a storage unit which are displayed on the display.

In the context of displaying pictures according to a television standard (NTSC, PAL), in the course of displaying a picture to be displayed on the display, synchronization between the display system and the picture source is performed after each picture line. With the result that a phase shift between the clock frequency of the display system and the frequency of the picture signal fed in occurs within a picture line. This leads to picture blur and to shadow effects at vertical edges.

SUMMARY OF THE INVENTION

It is accordingly an object of the invention to provide a display system and method for supplying a display system with a picture signal which overcome the above-mentioned disadvantages of the prior art devices and methods of this general type, in which the picture quality is improved and a reduction in particular shadow effects and picture blur is achieved.

With the foregoing and other objects in view there is provided, in accordance with the invention, a display system, including: a display; a display controller controlling the display; a picture controller connected to the display controller and operating in dependence on a system clock pulse, the system clock pulse defining a time response of picture pixels within a line; and a picture signal source connected to the picture controller and receiving the system clock pulse, the picture signal source feeding a picture signal to the picture controller in dependence on the system clock pulse so that the picture controller displays the picture signal on the display via the display controller in dependence on the system clock pulse.

A particularly good picture quality is achieved if the picture signal fed in is synchronized as a function of the system frequency of the display system.

In accordance with an added feature of the invention, the picture controller samples the picture signal with a sampling clock pulse that is dependent on the system clock pulse and results in a sampled picture signal, the picture controller initiates a display of a corresponding pixel on the display in accordance with the sampled picture signal, and the picture signal source feeding the picture signal to the picture controller with regard to the sampling clock pulse with a predeterminable phase shift.

In accordance with another feature of the invention, the predetermined phase shift is constant for at least one picture line of the display.

In accordance with another feature of the invention, there is a control unit and a second picture signal source connected to the picture controller, the second picture signal source feeding a further picture signal to the picture controller, the control unit receiving the system clock pulse and outputting a changeover signal to the picture controller, the changeover signal having a further predeterminable phase shift relative to the system clock pulse and defining which of the picture signal and the further picture signal is displayed on the display by the picture controller.

In accordance with a further added feature of the invention, the picture controller samples the picture signal with a sampling clock pulse that depends on the system clock pulse and results in a sampled picture signal, the picture controller initiating a display of a corresponding pixel on the display in accordance with the sampled picture signal, the picture signal source feeding the picture signal to the picture controller with regard to the sampling clock pulse with a predeterminable phase shift, the control unit sampling the system clock pulse at a sampling frequency whose reciprocal value is not equal to a multiple of a time period of the system clock pulse, and the control unit specifies the predetermined phase shift as a multiple of the reciprocal value of the sampling frequency.

With the foregoing and other objects in view there is further provided, in accordance with the invention, a method for supplying a picture signal, which includes: displaying a picture signal on a display of a display system in dependence on a system clock pulse, the system clock pulse defining a time response of picture pixels within a line; and feeding the picture signal to the display from a picture signal source in dependence on the system clock pulse.

In accordance with an added feature of the invention, there are the steps of: specifying the picture signal for at least one first picture pixel; subsequently specifying the picture signal for at least one second picture pixel; and specifying a change of the picture signal from one picture pixel to a next picture pixel in a predeterminable phase relationship relative to the system clock pulse.

In accordance with an additional feature of the invention, there are the steps of: feeding a further picture signal and a selection signal to the display system; displaying the picture signal and the further picture signal on the display by the display system in dependence on the selection signal; and changing the selection signal in a predeterminable further phase relationship relative to the system clock pulse.

In accordance with another feature of the invention, there is the step of sampling the picture signal resulting in a sampled value and subsequently displaying the sampled value where an instant of sampling is specified in dependence on the system clock pulse.

In accordance with a concomitant feature of the invention, there are the steps of: specifying the picture signal as a value for at least one first picture pixel; subsequently specifying the picture signal as a value for at least one second picture pixel; and changing the value of the picture signal from the value for the first picture pixel to the value for the second picture pixel in a predeterminable phase relationship relative to the instant of sampling.

Other features which are considered as characteristic for the invention are set forth in the appended claims.

Although the invention is illustrated and described herein as embodied in a display system and method for supplying a display system with a picture signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
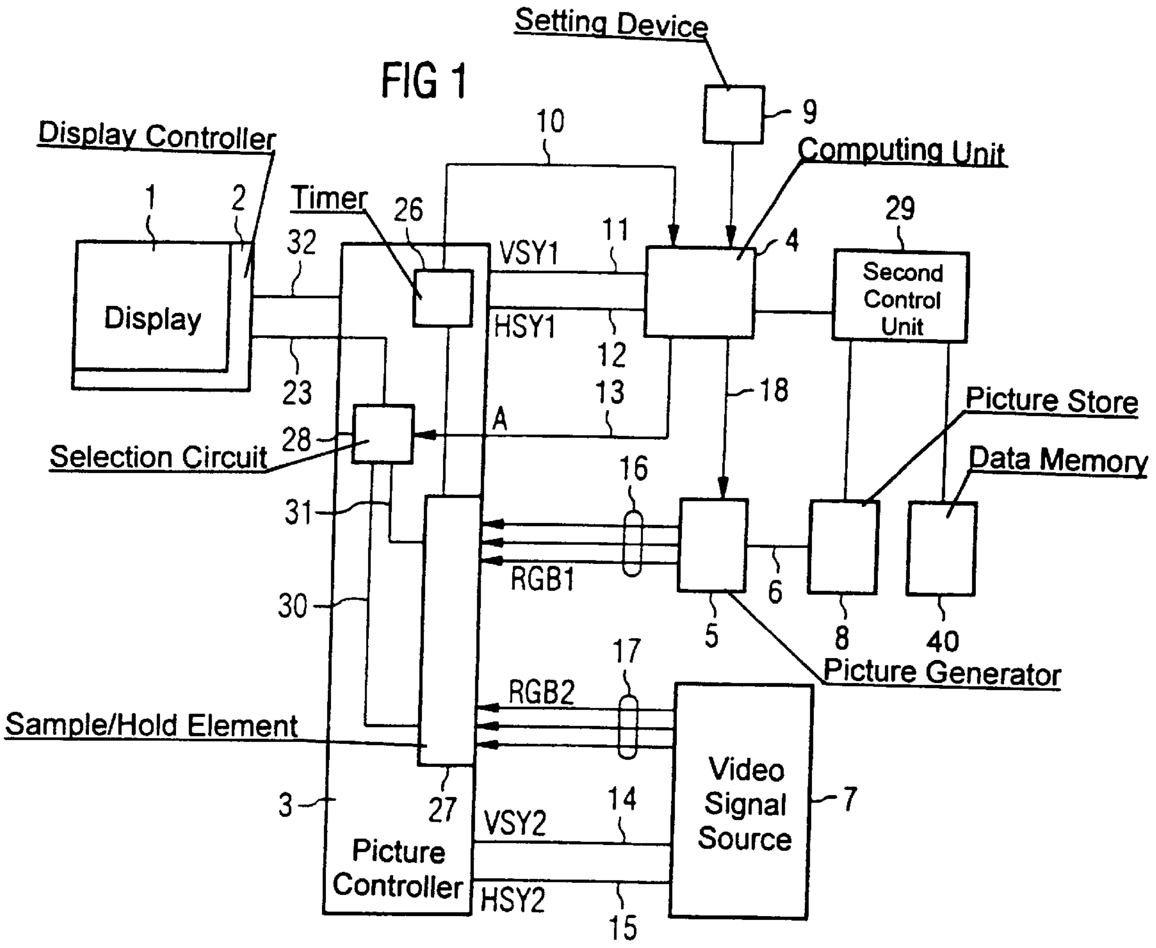
FIG. 1 is a diagrammatic block circuit diagram of a structure of a display system according to the invention.

In all the figures of the drawing, sub-features and integral parts that correspond to one another bear the same reference symbol in each case. Referring now to the figures of the drawing in detail and first, particularly, to FIG. 1 thereof, there is shown a display system in the form of logical blocks which can be realized either from individual modules or as an integrated circuit and/or in the form of software.

FIG. 1 shows a display 1, which is configured for example as a liquid crystal display, as a vacuum fluorescence display (VFD) or as a matrix formed by a multiplicity of light-emitting diodes (LED). The display 1 is provided with a display controller 2, by which the individual pixels of the display 1 can be driven. The display 1 is divided into lines and columns in accordance with a television picture. For this purpose, in the case of a liquid crystal display, for example, a multiplicity of thin film transistors are disposed in the form of a matrix, which transistors are composed of amorphous silicon and can be driven individually via a column and line driving line. A color picture is generated by a red, a blue and a green dot driven at a corresponding intensity with the aid of the thin film transistors, so that the colors of the red, blue and green dots together produce the color of a picture pixel.

The display controller 2 is connected via a driving line 23 to a picture controller 3. Leading from the picture controller 3, a clock line 10 is routed to a computing unit 4. Furthermore, a first and a second synchronization line 11, 12 are disposed between the picture controller 3 and the computing unit 4 and, moreover, a selection line 13 is routed from the computing unit 4 to the picture controller 3. The picture controller 3 is furthermore connected via a third and a fourth synchronization line 14, 15 to a video signal source 7, from which a second picture line 17 is routed to the picture controller 3.

The picture controller 3 is connected via a first picture line 16 to a picture generator 5, to which a first driving line 18 is routed from the computing unit 4. Moreover, the picture generator 5 is connected to a picture store 8 via a first data line 6.

The computing unit 4 is connected to a setting device 9 having control registers, for example. The picture controller 3 is connected via a second driving line 32 to the display controller 2.

The picture controller 3 is provided with a timer 26, which specifies a clock frequency for a sample/hold element 27 used to sample the picture signals of the first and second picture lines 16, 17. The RGB1 signal of the first picture line 16 is passed to a selection circuit 28 by the sample/hold element 27. The RGB2 signal of the second picture line 17 is likewise passed to the selection circuit 28 via a second sampling line 30. The selection line 13 of the computing unit 4 is connected to the selection circuit 28. The output of the selection circuit 28 is passed onto the driving line 23.

The computing unit 4 is furthermore connected to a second control unit 29, which is connected via data lines to the picture store 8 and to a data memory 40.

The method of operation of FIG. 1 is explained in more detail below. The picture controller 3 processes picture signals which are fed in for example as Red, Blue and Green signals of a television standard (PAL, NTSC). The picture signals fed in are in this case synchronized with regard to the picture controller 3. For this purpose, a first synchronization signal VSY1 is exchanged between the computing unit 4 and the picture controller 3 via the first synchronization line 11, which signal implements synchronization of the picture page change. This ensures that the picture controller 3 and the computing unit 4 simultaneously display, or provide, a new picture page. Furthermore, a second synchronization signal HSY1 is exchanged between the computing unit 4 and the picture controller 3 via the second synchronization line 12, which signal serves to synchronize the line change within a picture. In this way, it is ensured that the picture controller 3 and the computing unit 4 jump in synchronism from one picture line to the next picture line. The same synchronization is carried out between the picture controller 3 and the video signal source 7, by a third synchronization signal VSY2 being exchanged via the third synchronization line 14 and a fourth synchronization signal HSY2 being exchanged via the fourth synchronization line 15. The third synchronization signal VSY2 ensures that the picture controller 3 and the video signal source 7 carry out a picture page change in synchronism. The fourth synchronization signal HSY2 ensures that the picture controller 3 and the video signal source 7 carry out a line) change within a picture in synchronism.

In this way, both the first computing unit 4 and the video signal source 7 are synchronized with the picture controller 3 in accordance with a television standard, such as, PAL or NTSC. Either the picture controller 3 or the computing unit 4 or the video source 7 specifying the synchronization timing pulse, that is to say the first, the second, the third end the fourth synchronization signal VSY1, HSY1, VSY2, HSY2. Preferably, the first and the second synchronization signal and the third and the fourth synchronization signal are identical: VSY1=VSY2; HSY1=HSY2.

The computing unit 4 controls the picture generator 5 via the control line 18 in such a way that the picture generator 5 feeds a picture signal via the first picture line 16 to the sample/hold element 27 of the picture controller 3 in dependence on the first synchronization signal VSY1, the second synchronization signal HSY1 and in dependence on the system clock pulse of the picture controller 3. For the first picture signal RGB1, the first picture line 16 has a line for the color Red, a line for the color Blue and a line for the color Green. The color signals Red, Blue and Green are converted by the picture controller 3 and the driving unit 2 into a corresponding color of a corresponding pixel of the display 1.

Any desired colors can be displayed on the display 1 in accordance with the predetermined intensities of the color signals Red, Blue and Green. In accordance with the timing clock pulse predetermined by the computing unit 4, the picture generator 5 reads information for the color signals Red, Blue, Green from the picture store 8 and forwards the color signals to the sample/hold element 27 in accordance with the timing clock pulse predetermined by the computing unit 4.

The computing unit 4 controls the second control unit 29, which transfers picture data from the data memory 40 into the picture store 8 in accordance with the timing clock pulse predetermined by the computing unit 4.

The video signal source 7 feeds a second picture signal RGB2, which includes a color signal Red, a color signal Blue and a color signal Green, to the sample/hold element 27 in accordance with the synchronization by the third and fourth synchronization signals VSY2, HSY2. In a manner corresponding to the first picture line 16, the second picture line 17 has three lines for the color Red, Blue and Green.

The first picture signal RGB1 and the second picture signal RGB2 are sampled by the sample/hold element 27 and passed via a first picture signal line 31 and a second picture signal line 30 to a selection circuit 28. The selection circuit 28, as a function of the selection signal A fed in via the selection line 13, forwards either the first picture signal RGB1 or the second picture signal RGB2 to the display controller 2.

Via the second driving line 32 to the display controller 2, the picture controller 3 specifies the change from one picture pixel to the next picture pixel, the change from one picture line to the next picture line and the change from one picture page to the next picture page. In accordance with the control by the picture controller 3, the display controller 2 addresses the corresponding picture pixel with the picture signal (RGB1 or RGB2) fed by the picture controller 3.

The method of operation of the apparatus according to the invention and of the method according to the invention are explained in more detail below with reference to FIGS. 2*a*–2*m*. It is assumed that the first synchronization signal VSY1 and the third synchronization signal VSY2 are identical and are designated as vertical synchronization signal VSY, and that the second synchronization signal HSY1 and the fourth synchronization signal HSY2 are identical and are designated as horizontal synchronization signal HSY. The vertical and horizontal synchronization signals are specified by the picture generator 3 in this exemplary embodiment.

Figure 2:
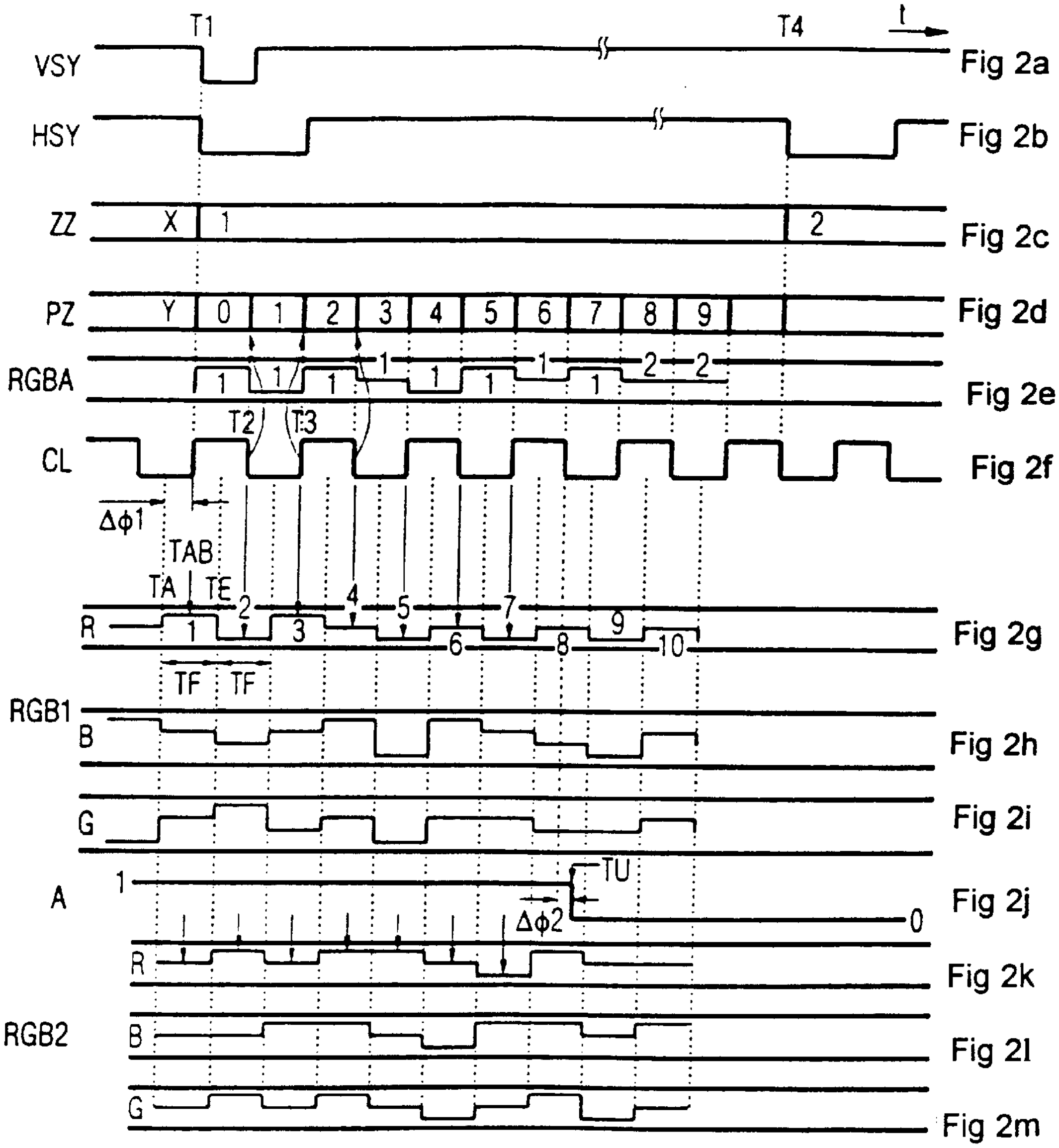
FIG. 2 is a signal timing diagram.

FIG. 2*a* shows the vertical synchronization signal VSY, which specifies a picture page change in the event of a change from a High state to a Low state. FIG. 2*b* shows a horizontal synchronization signal HSY, which specifies a line change in the event of a change from a High state to a Low state.

The picture controller 3, the picture generator 5 and the video signal source 7 are synchronized with the horizontal and vertical synchronization signals. With the result that, at the instant T1, the display controller 2 begins with the display of a new picture on the display 1, the picture generator 5 feeds the first picture signal RGB1 of a new picture to the picture controller 3 and the video signal source 7 feeds the second picture signal RGB2 of a new picture to the picture controller 3.

Likewise at the instant T1, the horizontal synchronization signal HSY specifies the beginning of a new line by a change from a High state to a Low state. At the instant T1, therefore, the picture generator 5 and the video signal source 7 feed the picture signal RGB1, RGB2 of the first pixel of a new picture line to the picture controller 3.

This is symbolically illustrated in FIG. 2*c* with the line counter ZZ. At the instant T1, at which a new picture is begun, the line counter ZZ changes from the count x, which represents the number of lines of the last picture, to the value 1 and thus indicates the first line of the new picture. At the instant T4, at which a line change is specified by the horizontal synchronization signal HSY (FIG. 2*b*), the line counter ZZ jumps to the value 2.

FIG. 2*d* shows, as a function of the time axis, a pixel counter PZ, which specifies which pixel is displayed on the display 1 as a function of the time. At the instant T1, the pixel counter PZ jumps from a value y, which corresponds to the number of pixels of the last line, to a value 0, since at the instant T1 a new line and thus a new pixel are driven. The line counter ZZ and the pixel counter PZ are integrated in the computing unit 4.

The driving signal RGBA, by which the corresponding picture pixel is driven by the picture controller 3, is illustrated in temporal synchronism with the pixel counter PZ in FIG. 2*e*. The driving signal RGBA is constant during the period of a picture pixel, thereby resulting in a step function for the driving signal RGBA.

FIG. 2*f* illustrates the system clock pulse CL of the picture controller 3, which has a constant frequency and constitutes a square-wave signal. The period between a rising and a falling edge of the system clock pulse CL preferably specifies the period of a picture pixel, which is represented by the pixel counter PZ. A rising or a falling edge of the system clock pulse CL specifies the start of a new pixel, which is symbolically illustrated by arrows taken from the edges of the system clock pulse CL to the pixel counter PZ. At the instant T2, an arrow is taken from the system clock pulse CL to the pixel counter PZ, which specifies the change from picture pixel 0 to picture pixel 1.

Likewise, from the next rising edge at the instant T3, an arrow is taken from the system clock pulse CL to the pixel counter PZ, which defines the change from picture pixel 1 to picture pixel 2. The system clock pulse CL is specified by the timer 26 in the picture controller 3. The system clock pulse CL thus defines the time response of the picture pixels within a picture line by the display controller 2.

The system clock pulse CL likewise specifies the sampling clock pulse with which the first and second picture signals RGB1, RGB2 are sampled by the sample/hold element 27. In this exemplary embodiment, sampling is carried out each time there is a rising or a falling edge of the system clock pulse CL. This is illustrated in FIGS. 2*f* and 2*g* in the form of arrows oriented to the first picture signal RGB1.

In dependence on the system clock pulse CL, the computing unit 4 controls the output of the picture generator 5 in such a way that a new first picture signal RGB1 with a predeterminable first phase relationship $\delta\psi 1$ (temporal shift) relative to the system clock pulse CL is passed to the sample/hold element 27.

FIGS. 2*g*, 2*h* and 2*i* show an example of a first picture signal RGB1, the color signal Red R being illustrated in FIG. 2*g*, the color signal Blue B being illustrated in FIG. 2*h* and the color signal Green G being illustrated in FIG. 2*i*. The color signals R, G, B are held constant, in synchronism with one another, for in each case a predetermined time period TF and are subsequently adapted by the picture generator 5 to a new color value which is read from the picture store 8 for the corresponding picture pixel and is likewise held constant again for a predetermined time period TF. In this way, a stepped characteristic is produced for each of the color signals R, B, G.

In this exemplary embodiment, the color signals are preferably synchronized with one another, but a temporal shift in the change in the individual color signals Red, Blue, Green relative to one another is also possible, in which case, however, it is then also necessary to adapt the sampling correspondingly for the color signals.

In this exemplary embodiment, the instants at which the color signals Red, Blue and Green of the first picture signal RGB1 are sampled are determined by rising or falling edges of the system clock pulse CL and are illustrated in the form of arrows which are taken to the color signal Red of the first picture signal in FIG. 2*g*.

The phase relationship (temporal shift) between the system clock pulse CL and the first picture signal RGB1 that has been chosen in this exemplary embodiment consists in a predeterminable first phase shift δψ1 between the edge change of the system clock pulse and the change of the first picture signal RGB1 output by the picture generator 5, the picture generator 5 carrying out a change of the first picture signal for one picture pixel to the first picture signal for the following picture pixel with a predeterminable phase shift (temporal shift) relative to the edges of the system clock pulse, preferably with a predeterminable first phase shift δψ1 (temporal shift) relative to the sampling instants of the sample/hold element 27.

If the phase relationship (temporal shift) relative to the system clock pulse CL is considered for the color signal Red R of the first picture signal RGB1, then it becomes clear E from FIGS. 2*g* and 2*f* that at the starting instant T1, the color signal Red R is set to a new value for the next picture pixel by the picture generator 5 and this value is maintained until the end instant TE in order then to be set once again to a new value by the picture generator 5. The value then again being held constant for the same period of time.

The starting instant TA, at which the first picture signal RGB1 is changed, is shifted by a first predeterminable phase shift δψ1 (time period) relative to the edge change of the system clock pulse CL. This applies both to the rising and to the falling edge of the system clock pulse CL. Since the system clock pulse specifies the sampling clock pulse in this exemplary embodiment, the phase shift (temporal shift) also applies relative to the sampling clock pulse with which the sample/hold element 27 samples the first picture signal.

If the sampling operation of the sample/hold element 27 is now considered, then sampling is carried out each time there is a rising or a falling edge of the system clock pulse CL, as is illustrated by the arrows in FIGS. 2*f*, 2*g* which are taken from the system clock pulse CL to the first picture signal RGB1. At the sampling instant TABS the sample/hold element 27 samples the color signal values Red, Blue and Green of the first picture signal RGB1. The sampled value is displayed on the display 1 for the time period from the instant T1 to the instant T2 by the picture controller 3 and the display controller 2. The displayed picture value of the display 1 is shown divided into picture pixels in FIG. 2*e*.

FIGS. 2*k*, 2*l* and 2*m* show the color signal Red R, the color signal Blue B and the color signal Green G of the second picture signal. In a manner corresponding to the color signals of the first picture signal, the color signals R, G, B of the second picture signal are temporally synchronized with one another and are held at a constant value for a predetermined time period, with the result that a step function is produced for each of the color signals. The sampling instants at which the sample/hold element 27 samples the second picture signal are illustrated above the color signal Red R, FIG. 2*k*, likewise in the form of arrows.

The selection signal A is illustrated in FIG. 2*j* and has the value 1 until the changeover instant TU and the value 0 after the changeover instant TU, with the result that the first picture signal RGBl is displayed on the display 1 prior to the changeover instant TU and the second picture signal RGB2 is displayed on the display 1 after the changeover instant TU. The changeover instant TU is chosen by the computing unit 4 in such a way that the changeover instant TU is shifted by a predeterminable second phase shift δψ2 (second time period) relative to a rising or a falling edge of the system clock pulse CL, in particular relative to the sampling clock pulse.

FIG. 2*e* illustrates the driving signal RGBA with which the display controller 2 drives the display 1. The first or the second picture signal RGB1, RGB2 is symbolically represented in FIG. 2*e* by the number 1 or 2. The numbers 1 or 2 specify which picture signal is forwarded by the selection circuit 28 to the driving unit 2. The picture signal which is reproduced on the display 1 by the driving unit 2 is the first picture signal RGB1 until the changeover instant TU and the second picture signal RGB2 after the changeover instant TU. Thus, the first picture signal RGB1 is displayed in the picture pixels of the pixel counter PZ which are provided with the numbers 1 to 7, and the second picture signal RGB2 is displayed in the picture pixels which are identified by the numbers 8 and 9 of the pixel counter PZ.

The vertical synchronization signal VSY has a frequency of 50 to 60 Hz, the horizontal synchronization signal HSY has a frequency range from 14 to 18 kHz, and the sampling frequency f of the computing unit 4 at which the computing unit 4 samples the system clock pulse CL of the picture controller 3 lies in a range between 4 and 40 MHz.

The computing unit 4 samples the timing clock pulse CL at a frequency f which is greater than the frequency of the timing clock pulse CL and is preferably not equal to a multiple of the frequency of the timing clock pulse CL. In the example specified, the frequency of the timing clock pulse CL is 3.2 MHz and the sampling frequency f is 40 MHz. The time period of a pixel, which time period is illustrated by the pixel counter PZ in FIG. 2*d*, thus amounts to: 1/CL=156 μs and the first phase shift δψ1, which can be specified by the computing unit 4, between the timing clock pulse CL and the changeover instants of the first picture signal RGB1 can thus be defined at a multiple of the reciprocal value of the sampling frequency f: $n\cdot(1/f)=n\cdot 25\ \mu s$ where the sampling frequency f of the computing unit 4 is preferably not equal to a multiple of the frequency of the timing clock pulse CL. If the sampling frequency f is not equal to a multiple of the frequency of the timing clock pulse CL, then the sampling frequency can be chosen to be almost equal to, but greater than, the frequency of the timing clock pulse CL and good tuning of the first phase shift δψ1 (temporal shift) by the computing unit 4 is nevertheless provided.

The first phase shift δψ1 is preferably held constant within a picture line by the computing unit 4. A very good picture quality is achieved if the first phase shift δψ1 (first temporal shift) is held constant within a picture. An advantageous development is afforded if, in the course of sampling a first picture signal, the first picture signal provided for the corresponding picture pixel from the picture store 8 is always sampled in good time, so that the correct picture pixel is always driven by the correct picture signal. Edge displacements and shadow effects are avoided in this way.

The computing unit 4 is connected to the setting device 9 having control registers, for example, with which optionally the first or the second phase shift $\delta\psi 1$, $\delta\psi 2$ (first or second temporal shift) can be set by a user, taking account of the picture quality. The setting of the first and/or of the second phase shift makes it possible to set optimum synchronization dependent on the picture definition of the display 1.

We claim:

1. A display system, comprising:

a display;

a display controller controlling said display;

a picture controller connected to said display controller and operating in dependence on a system clock pulse, said system clock pulse defining a time response of picture pixels within a line;

a picture signal source connected to said picture controller and receiving said system clock pulse, said picture signal source feeding a picture signal to said picture controller in dependence on said system clock pulse so that said picture controller displays said picture signal on said display via said display controller in dependence on said system clock pulse;

said picture controller sampling said picture signal with a sampling clock pulse that is dependent on said system clock pulse to provide a sampled picture signal;

said picture controller initiating a display of a corresponding pixel on said display in accordance with said sampled picture signal; and said picture signal source feeding said picture signal to said picture controller with regard to said sampling clock pulse with a predeterminable phase shift.

2. The display system according to claim 1, wherein said predetermined phase shift is constant for at least one picture line of said display.

3. The display system according to claim 1, including a control unit and a second picture signal source connected to said picture controller, said second picture signal source feeding a further picture signal to said picture controller, said control unit receiving said system clock pulse and outputting a changeover signal to said picture controller, said changeover signal having a further predeterminable phase shift relative to said system clock pulse and defining which of said picture signal and said further picture signal is displayed on said display by said picture controller.

4. The display system according to claim 3, wherein said picture controller samples said picture signal with a sampling clock pulse that depends on said system clock pulse and results in a sampled picture signal, said picture controller initiating a display of a corresponding pixel on said display in accordance with said sampled picture signal, said picture signal source feeding said picture signal to said picture controller with regard to said sampling clock pulse with a predeterminable phase shift, said control unit sampling said system clock pulse at a sampling frequency whose reciprocal value is not equal to a multiple of a time period of said system clock pulse, and said control unit specifies said predetermined phase shift as a multiple of said reciprocal value of said sampling frequency.

5. A method for supplying a picture signal, which comprises:

generating a display signal out of a picture signal with a picture controller for displaying a picture on a display of a display system in dependence on a system clock pulse, the system clock pulse defining a time response of picture pixels within a line;

feeding the picture signal to the picture controller from a picture signal source in dependence on the system clock pulse;

specifying the picture signal for at least one first picture pixel;

subsequently specifying the picture signal for at least one second picture pixel; and specifying a change of the picture signal from one picture pixel to a next picture pixel in a predeterminable phase relationship relative to the system clock pulse.

6. The method according to claim 5, which comprises:

feeding a further picture signal and a selection signal to the display system;

displaying the picture signal and the further picture signal on the display by the display system in dependence on the selection signal; and changing the selection signal in a predeterminable further phase relationship relative to the system clock pulse.

7. The method according to claim 5, which comprises sampling the picture signal resulting in a sampled value and subsequently displaying the sampled value where an instant of sampling is specified in dependence on the system clock pulse.

8. The method according to claim 7, which comprises:

specifying the picture signal as a value for at least one first picture pixel;

subsequently specifying the picture signal as a value for at least one second picture pixel; and changing the value of the picture signal from the value for the first picture pixel to the value for the second picture pixel in a predeterminable phase relationship relative to the instant of sampling.

9. A display system as in claim 1, wherein said picture controller provides at least one synchronization signal to said picture signal source.

10. A display system as in claim 9, wherein said synchronization signals provide horizontal and vertical synchronizations.

* * * * *